(12) United States Patent
Dohi et al.

(10) Patent No.: US 7,802,918 B2
(45) Date of Patent: Sep. 28, 2010

(54) HEAT DETECTOR

(75) Inventors: Manabu Dohi, Tokyo (JP); Tetsuya Nagashima, Tokyo (JP); Yoshimi Kawabata, Tokyo (JP); Yasuo Ohmori, Tokyo (JP)

(73) Assignee: Hochiki Corporation, Tokyo (JP)

( * ) Notice: Subject to any disclaimer, the term of this patent is extended or adjusted under 35 U.S.C. 154(b) by 201 days.

(21) Appl. No.: 11/815,649

(22) PCT Filed: Feb. 3, 2006

(86) PCT No.: PCT/JP2006/301881

§ 371 (c)(1),
(2), (4) Date: Nov. 5, 2007

(87) PCT Pub. No.: WO2006/082931

PCT Pub. Date: Aug. 10, 2006

(65) Prior Publication Data

US 2009/0028215 A1    Jan. 29, 2009

(30) Foreign Application Priority Data

Feb. 7, 2005 (JP) ............................. 2005-030982
Jan. 27, 2006 (JP) ............................. 2006-019218

(51) Int. Cl.
G01K 1/00    (2006.01)
G01K 7/00    (2006.01)

(52) U.S. Cl. ........................................ 374/208; 374/177

(58) Field of Classification Search ................ 374/208, 374/177
See application file for complete search history.

(56) References Cited

U.S. PATENT DOCUMENTS

| 4,956,554 | A  |   | 9/1990  | Baker et al.      |
|-----------|----|---|---------|-------------------|
| 5,584,579 | A  | * | 12/1996 | Asano et al. ............... 374/208 |
| 5,751,059 | A  |   | 5/1998  | Prost             |
| 7,011,444 | B2 |   | 3/2006  | Mayusumi et al.   |

FOREIGN PATENT DOCUMENTS

| CN | 1035892     | 9/1989  |
|----|-------------|---------|
| EP | 1298615     | 4/2003  |
| EP | 1298617     | 4/2003  |
| JP | 59-000924   | 1/1984  |
| JP | 2-253128    | 10/1990 |
| JP | 06-160423   | 6/1994  |
| JP | 06-282773   | 10/1994 |
| JP | 09-147261   | 6/1997  |
| JP | 09-159545   | 6/1997  |
| JP | 10-103235   | 4/1998  |
| JP | 2000-298061 | 10/2000 |

(Continued)

*Primary Examiner*—Lisa M Caputo
*Assistant Examiner*—Mirellys Jagan
(74) *Attorney, Agent, or Firm*—Sherr & Vaughn, PLLC

(57) ABSTRACT

An object is to build a protective structure which can protect a ferroelectric material from a surrounding environment when the ferroelectric material is used as a heat detecting element of a heat detector, thereby enhancing the reliability of the heat detector.

A heat detector includes a heat detecting unit 11 that senses heat in a monitoring area, and a casing 81 that holds the heat detecting unit 11, and the heat detecting unit is held by the casing 11 via a laminating portion 60 which serves to protect the heat detecting unit 11.

3 Claims, 10 Drawing Sheets

FOREIGN PATENT DOCUMENTS

| | | |
|---|---|---|
| JP | 2001-357467 | 12/2001 |
| JP | 2002-343336 | 11/2002 |
| JP | 2002-369047 | 12/2002 |
| JP | 2003-196760 | 7/2003 |
| JP | 2004-272702 | 9/2004 |
| JP | 2004-295704 | 10/2004 |

* cited by examiner

[FIG. 1]
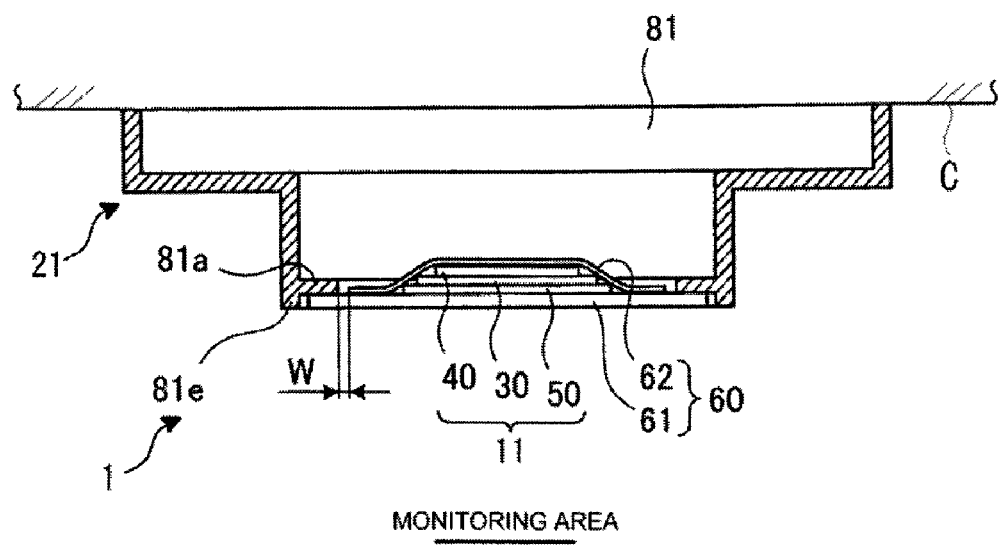
MONITORING AREA
[FIG. 2]
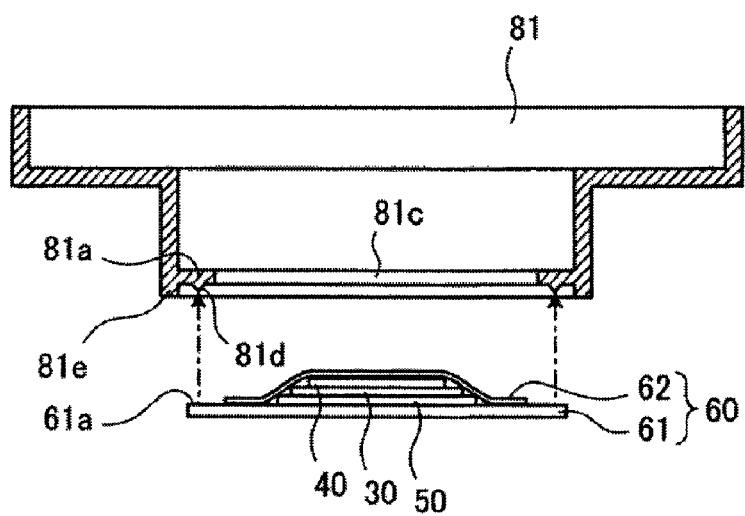

[FIG. 3]
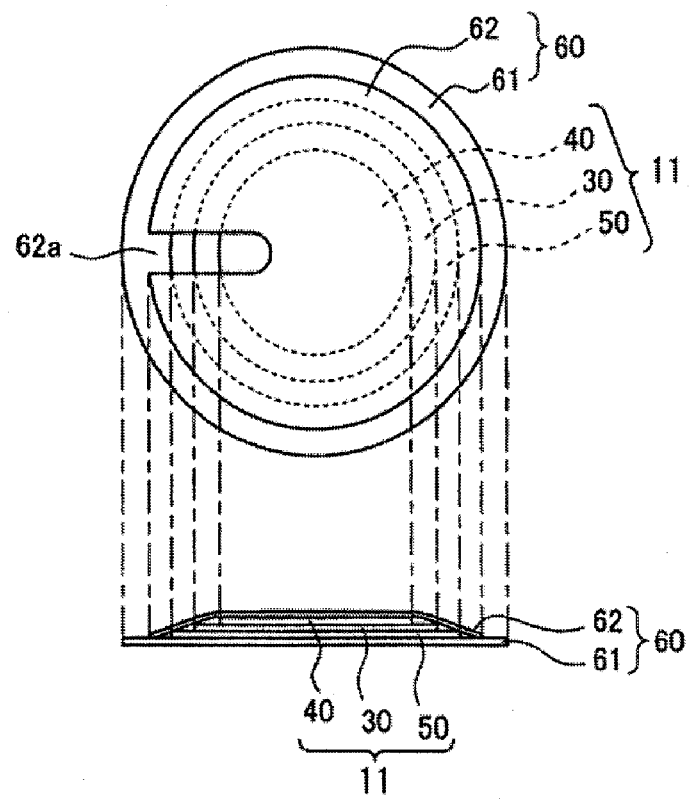
[FIG. 4]
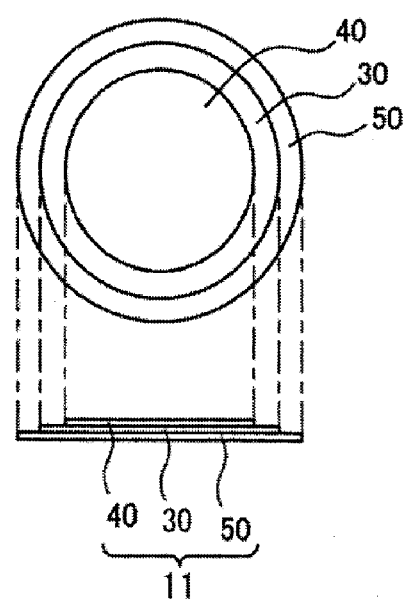

[FIG. 5]
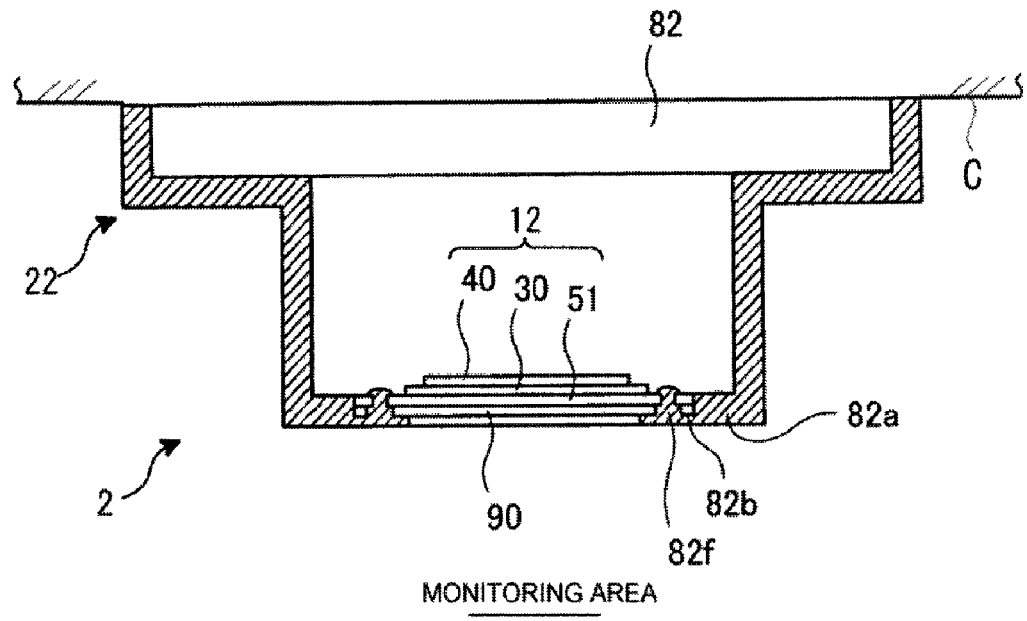
MONITORING AREA
[FIG. 6]
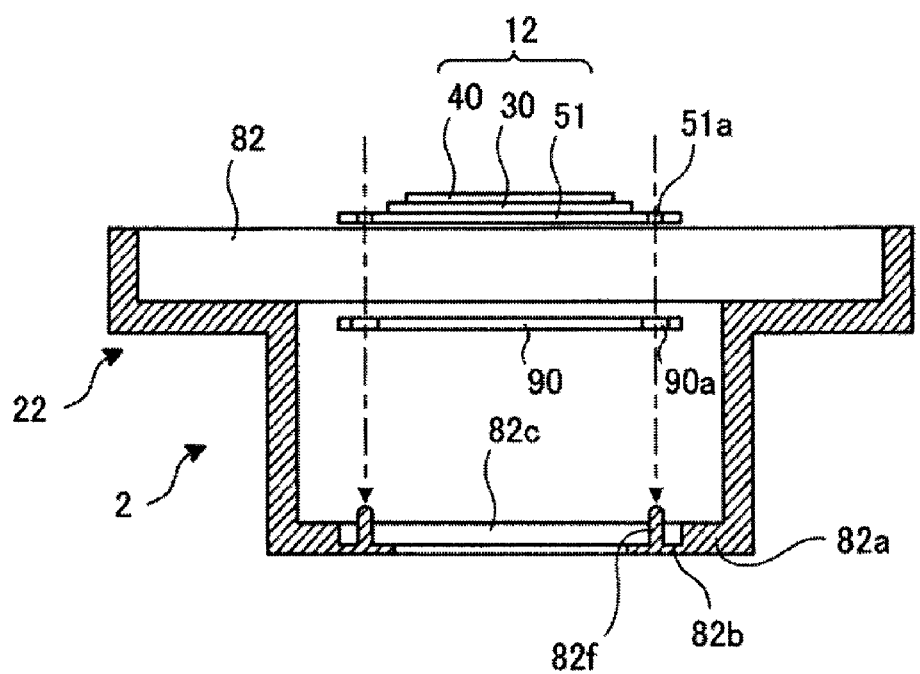

[FIG. 7]
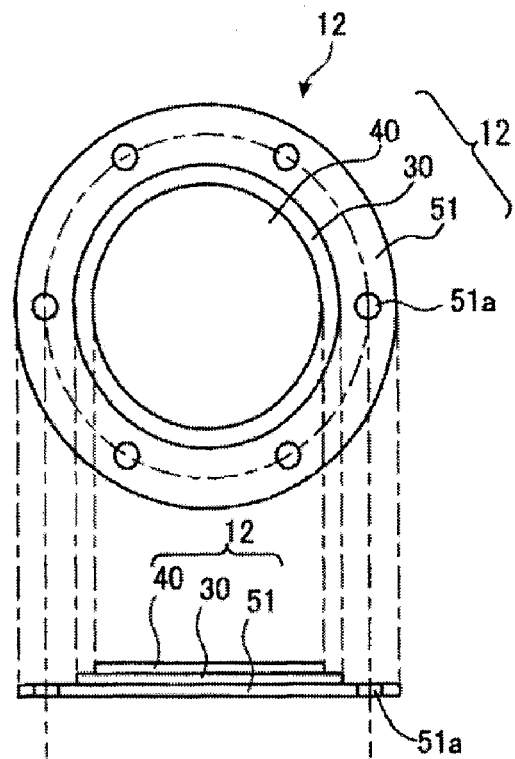
[FIG. 8]
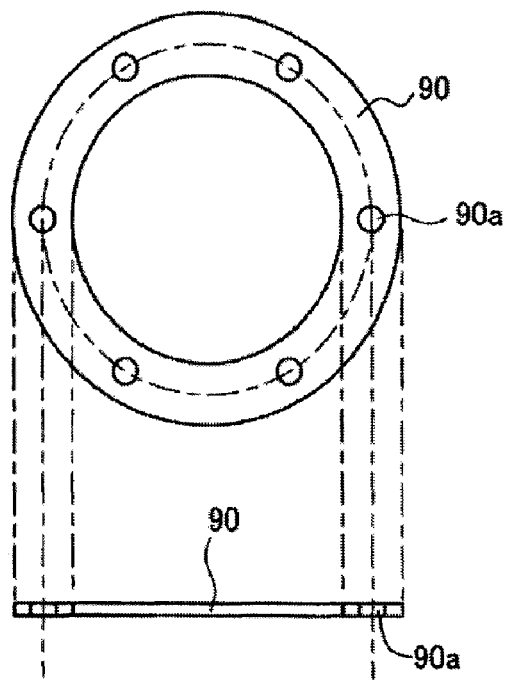

[FIG. 9]
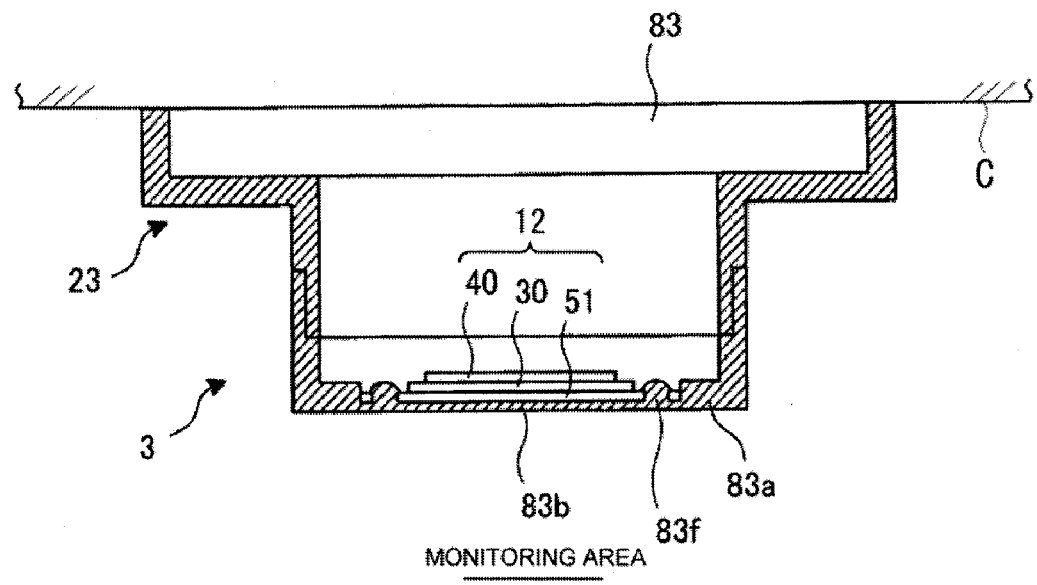
MONITORING AREA
[FIG. 10]
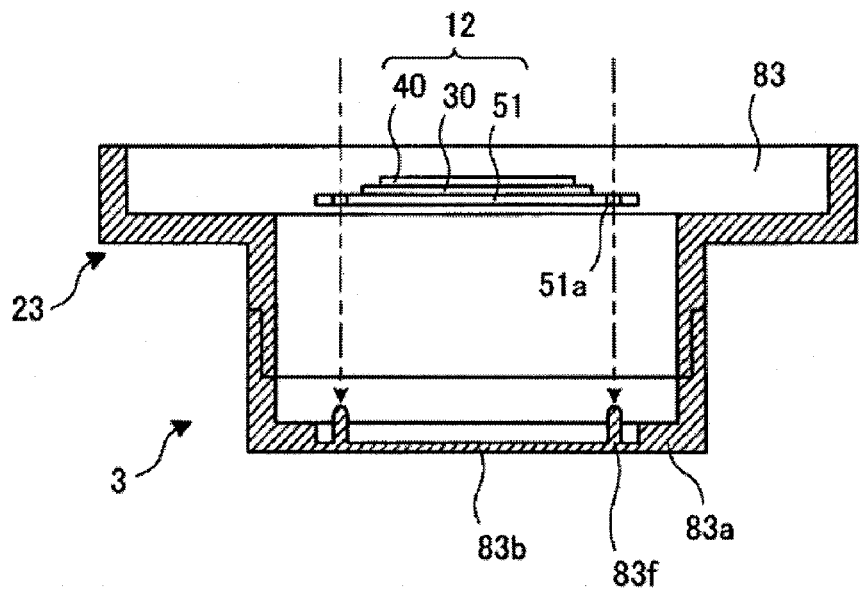

[FIG. 11]
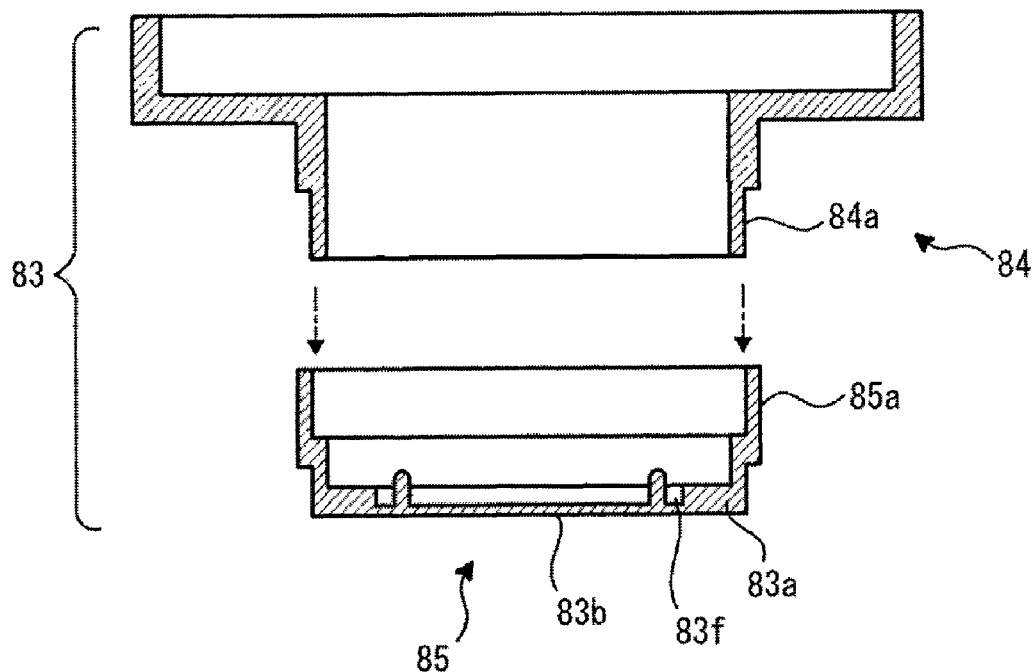
[FIG. 12]
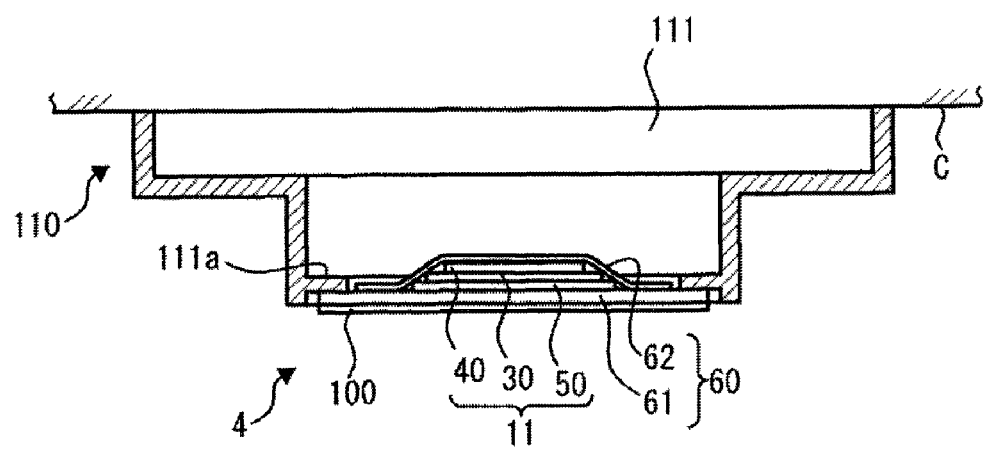
MONITORING AREA

[FIG. 13]
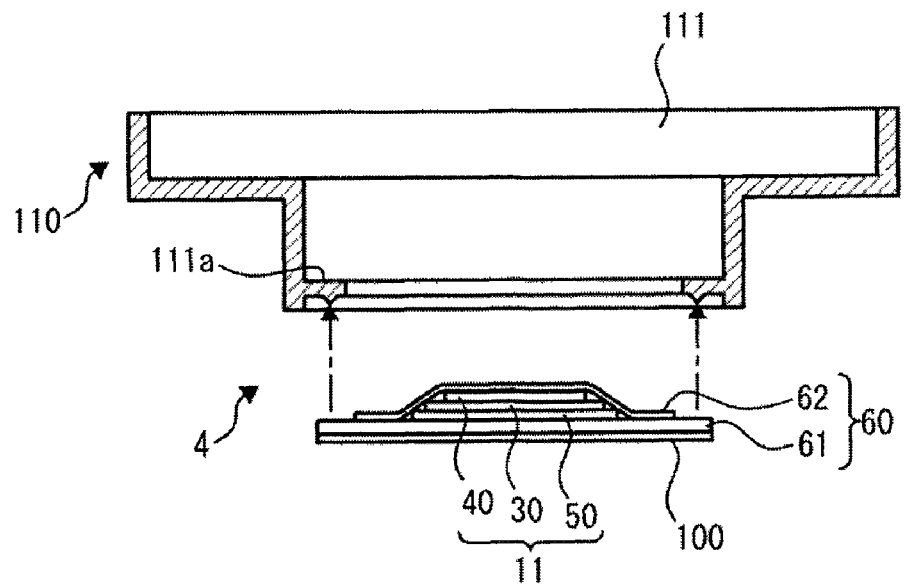
[FIG. 14]
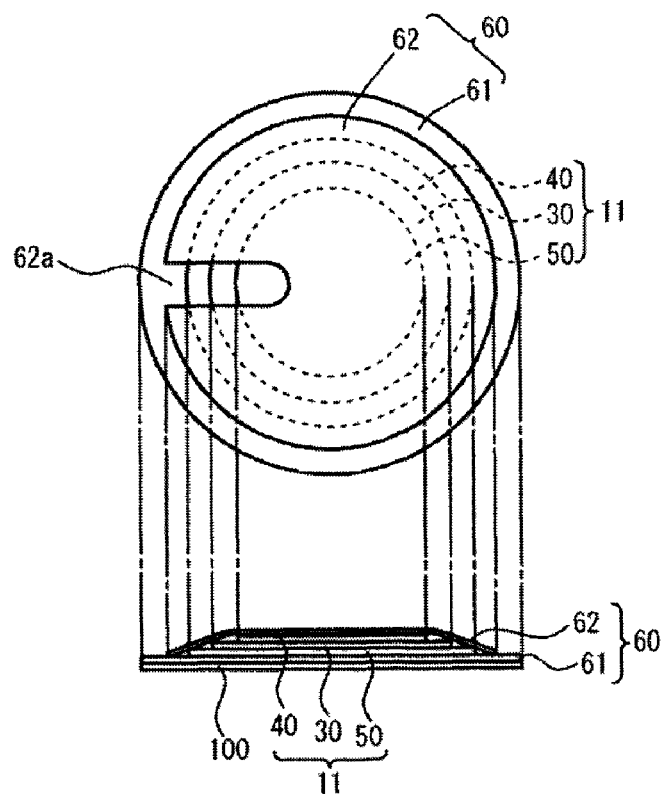

[FIG. 15]
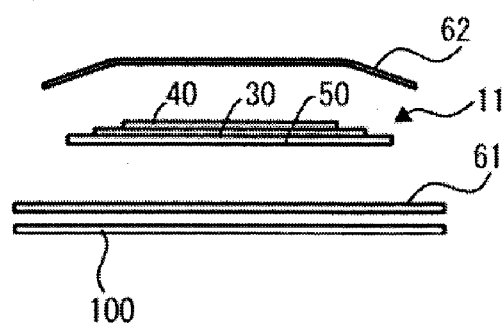
[FIG. 16]
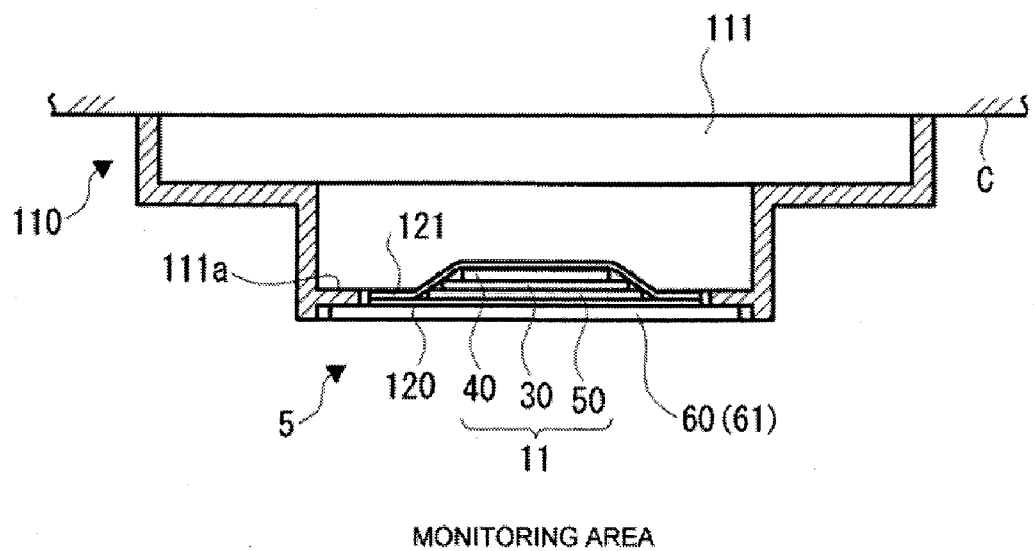
MONITORING AREA

[FIG. 17]
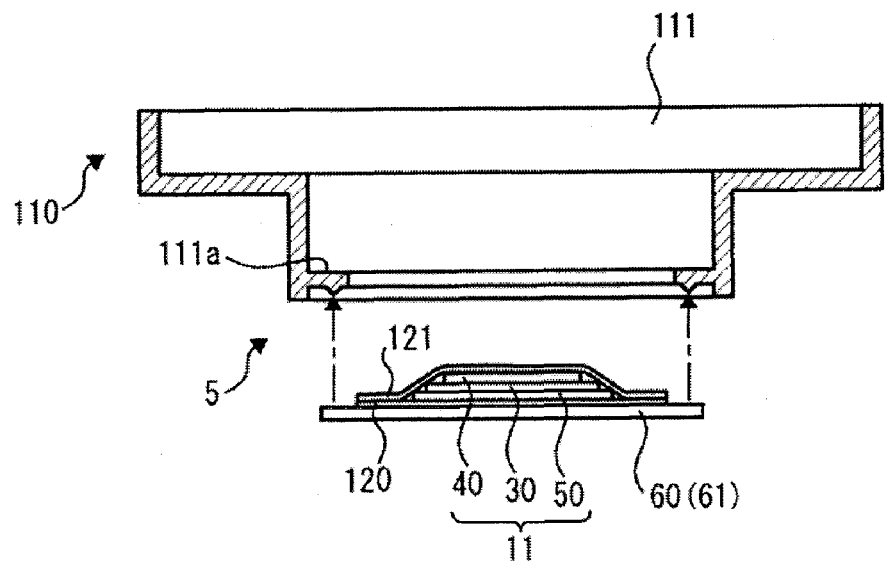
[FIG. 18]
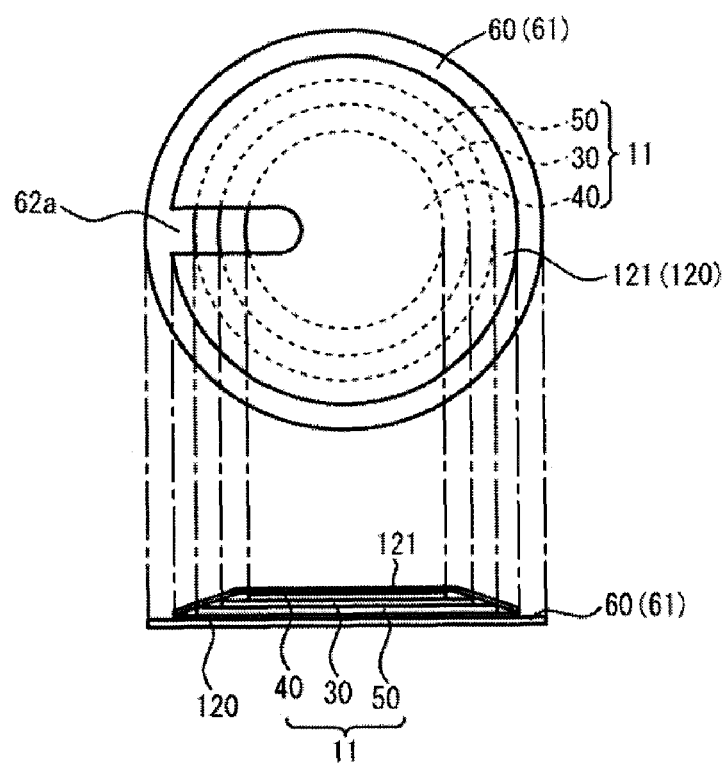

[FIG. 19]
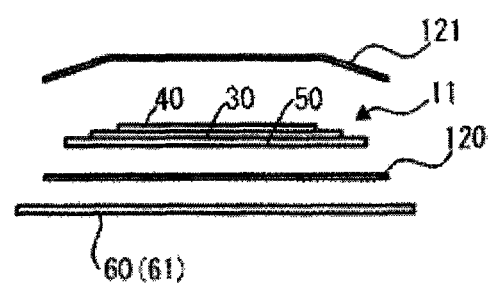
[FIG. 20]
Prior Art
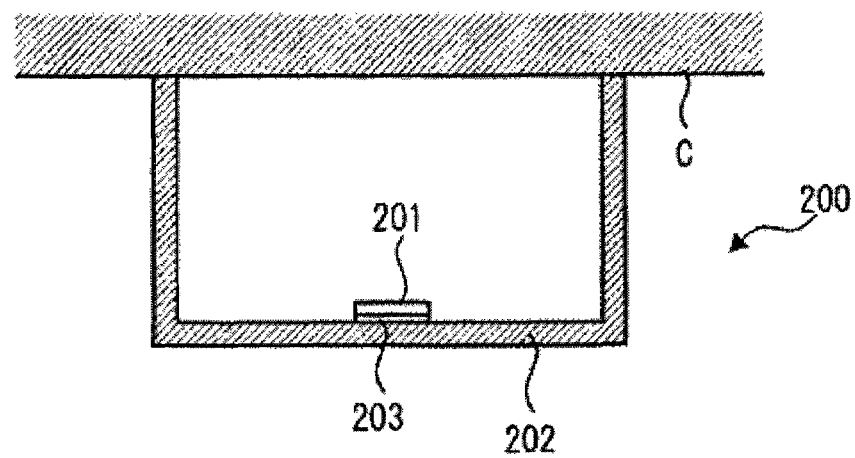

HEAT DETECTOR

TECHNICAL FIELD

The present invention relates to a heat detector that senses heat in a monitoring area and raises an alarm according to a sensed state.

BACKGROUND ART

Conventionally, heat detectors which sense an occurrence of a fire by sensing heat generated by the fire are proposed. Such heat detectors are roughly classified into differential heat detectors and fixed-temperature heat detectors based on the principle employed for sensing. Such a heat detector, in general, includes a heat detecting unit that senses heat in a monitoring area and a sensing-device main body that raises an alarm according to a state sensed by the heat detecting unit.

The heat detecting unit has a sensor unit which senses heat in the monitoring area and converts a sensed state into another state change. The sensor unit is formed of, for example, a diaphragm which changes shape according to an expansion of air caused by temperature rise, a thermistor which changes resistance according to the temperature, or a bimetal which changes shape in a predetermined direction according to the temperature.

FIG. 20 is a vertical sectional view of a conventional heat detector. A heat detector 200 includes a heat detecting unit 201 and a sensing-device main body 202, and is installed onto an attachment surface such as a surface C of a ceiling. The heat detecting unit 201 is directly connected to the inside of the sensing-device main body 202 by adhesive 203 (see for example Japanese Patent Application Laid-Open No. 2003-196760).

DISCLOSURE OF INVENTION

Problems to be Solved by the Invention

The conventional heat detector, however, has various problems. For example, the heat detector provided with a diaphragm needs to have a chamber with a substantial expansion space in order to correctly detect the rate of temperature rise equal to or higher than a predetermined rate. The heat detector provided with a thermistor is relatively bulky because the thermistor itself is bulky and also because a thermistor guide is provided around the thermistor for the protection thereof. Thus, such a heat detector is difficult to make thinner. Further, the heat detector provided with bimetal needs to save a sufficient space for the transformation of bimetal. Thus, downsizing of these conventional heat detectors is difficult to realize.

The inventors of the present invention and others examine the use of a ceramic element as a heat detecting element. The ceramic element is a ferroelectric material and outputs pyroelectric current by a pyroelectric effect at the temperature change. Since the ceramic element can be molded into a thin film-like shape, the use of the ceramic element as the heat detecting element allows for downsizing of the heat detector as a whole.

However, when the ferroelectric material is employed as the heat detecting element in the conventional heat detector as described above, various problems may arise. The ferroelectric material is sometimes more sensitive to the surrounding environment than the conventionally used heat detecting elements, such as diaphragm, thermistor, and bimetal. Hence, it is desirable that the ferroelectric material be used as the heat detecting element together with a framework that protects the ferroelectric material from the surrounding environment.

The present invention is made in view of the foregoing, and an object of the present invention is to enhance the reliability of the heat detector by providing a protective structure which can protect the ferroelectric material used as the heat detecting element of the heat detector from the surrounding environment.

Means for Solving the Problems

To solve the problems as described above and to achieve an object, according to one aspect of the present invention, a heat detector includes a heat detecting unit that senses heat in a monitoring area, and a casing that holds the heat detecting unit, and a protector is provided closer to the monitoring area at least than the heat detecting unit to protect the heat detecting unit.

According to another aspect of the present invention, the protector is a stress absorber that absorbs distortion of the heat detecting unit.

Further, according to still another aspect of the present invention, the protector is provided closer to the monitoring area at least than the heat detecting unit, and serves as an entrance preventer that prevents entrance of a predetermined material from the monitoring area into the heat detecting unit.

Effect of the Invention

According to the present invention, since the heat detecting unit can be protected by the protector, the ferroelectric material, which is relatively sensitive to the changes in the surrounding environment, can be applied as the heat detecting element of the heat detector, whereby a thin and small heat detector can be provided.

According to the present invention, the heat detector includes a stress absorber which can absorb distortion of the casing and distortion caused by the difference in the coefficients of thermal expansion of the heat detecting unit and the casing when the ambient temperature and the ambient pressure change. Therefore, the distortion can be prevented from being generated in the heat detecting unit, which leads to the prevention of malfunction of the heat detecting unit, the prevention of falling off of the heat detecting unit from the casing, and the prevention of damages to the heat detecting unit and the casing.

According to the present invention, since the entrance preventer is arranged closer to the monitoring area than the heat detecting unit, the entrance preventer prevents the entrance of moisture and corrosive materials from the monitoring area into the heat detecting unit. Thus, the degradation and the corrosion of the heat detecting unit can be prevented, and the reliability of the heat detector can be maintained for a long time.

BEST MODES FOR CARRYING OUT THE INVENTION

Embodiments of a heat detector according to the present invention will be described in detail with reference to the accompanying drawings hereinbelow. Firstly, [I] a common structure of the embodiments, secondly [II] specific feature of the embodiments, and finally [III] variation of the embodiments will be described.

[I] Common Structure of Embodiments

First, the common structure of the embodiments will be described. A heat detector according to each of the embodiments is installed at an attachment surface such as a ceiling. The heat detector includes a heat detecting unit and a sensing-device main body. Here, the heat detecting unit is a thermal sensor that senses heat in a monitoring area. The sensing-device main body decides whether the fire occurs or not based on an output from the heat detecting unit. On deciding that the fire occurs, the sensing-device main body raises an alarm or notifies the trouble. The sensing-device main body further includes a controlling unit and a casing. The controlling unit is a controller that raises an alarm according to the result of decision on the presence/absence of the fire. The casing is a framework of the heat detector.

The heat detector according to each of the embodiments includes a protector. The protector serves to protect the thermal sensor which is fixed to the casing via the protector. The purpose of the protection is to absorb the distortion of the thermal sensor, and/or to prevent a predetermined material from entering into the thermal sensor from the monitoring area.

In the conventional device, the heat detecting unit and the casing are entirely fixed with each other by adhesive. When such a structure is employed for a heat detector including the ceramic element as the sensing unit, a stress may be applied to an interface between the heat detecting unit and the casing fixed by the adhesive, if the casing is distorted or if the heat detector is distorted due to the difference in the coefficients of thermal expansion of the heat detecting unit and the casing at the changes in the ambient temperature and/or the changes in the air pressure. The stress applied to the heat detecting unit affects the output from the heat detecting unit by piezoelectric effect, whereby the heat detecting unit may not be able to correctly sense the heat. Further, the heat detecting unit may fall off from the casing. Still further, one of the heat detecting unit and the casing may be damaged.

Still further, in the above structure, heat is transferred from the heat detecting unit that senses the heat to the casing which has a larger thermal capacity. Then, the thermal responsiveness of the heat detecting unit is degraded. In brief, the transfer of heat from the heat detecting unit to the casing contributes to the degradation of the thermal responsiveness of the heat detecting unit.

In the embodiments of the present invention, the distortion of the heat detecting unit caused by the difference in the coefficients of thermal expansion of the heat detecting unit and the casing, or the like, is alleviated, whereby the precision of sensing by the heat detecting unit and the connection reliability of the heat detecting unit and the casing are improved, and further the thermal responsiveness of the heat detecting unit is improved, resulting in the enhancement of the reliability of the heat detecting unit.

Specifically, in the embodiments, a thin structure is provided between the heat detecting unit and the casing, so that the thermal stress generated by the difference in the coefficients of thermal expansion of the heat detecting unit and the casing is absorbed, whereby the distortion between the heat detecting unit and the casing caused by the temperature rise is absorbed. Further, such structure provided for the absorption of stress serves to minimize the thermal conduction from the heat detecting unit to the casing. Still further, when the heat detecting unit is distorted because of the expansion or the contraction of the air sealed inside the heat detecting unit at the changes in air pressure or/and temperature, such distortion can be absorbed.

Still further, in the embodiments, the heat detecting unit and the casing are fixed with each other by melting and not by the adhesive so that the connection between the heat detecting unit and the casing can be easily achieved. For example, a thin plate-like member of the heat detecting unit is melted and adhered to the casing.

When the ferroelectric material is actually put into practical use as the heat detecting element, it is necessary to provide a packaging structure for securing a sufficient environmental resistance while maintaining the thermal responsiveness of the ferroelectric material. To secure the thermal responsiveness of the ferroelectric material, the ferroelectric material is preferably exposed to the monitoring area as direct as possible, so that the temperature changes in the monitoring area is directly transmitted to the ferroelectric material. When the ferroelectric material is simply exposed to the monitoring area, however, an external force applied from the monitoring area may deform the ferroelectric material, or/and various material entering into the heat detector from the monitoring area may degrade or/and corrode the ferroelectric material, for example.

In the embodiments, two contradictory purposes, i.e., maintenance of the thermal responsiveness of the ferroelectric material and the protection of the ferroelectric material are simultaneously achieved.

[II] Specific Features of Embodiments

Next, the embodiments of the heat detector will be described. It should be noted, however, that the present invention is not limited by the embodiments.

First Embodiment

A first embodiment will be first described. Schematically, a heat detector according to the first embodiment is mainly characterized in that a heat detecting unit is fixed to a thin plate-like member by an adhesive film, that the heat detecting unit is connected to a casing via the thin plate-like member, and that the heat detecting unit is exposed to a monitoring area via the thin plate-like member.

FIG. 1 is a vertical sectional view of a heat detector 1 in a state where the heat detecting unit is connected to the casing, and FIG. 2 is a vertical sectional view of the heat detector 1 in a state before the heat detecting unit is connected to the casing. As shown in FIGS. 1 and 2, the heat detector 1 includes a heat detecting unit 11 and a sensing-device main body 21.

A structure of the heat detecting unit 11 will be described below. FIG. 3 shows a plan view and a vertical sectional view of the heat detecting unit sandwiched between laminating members in association with each other, and FIG. 4 shows a plan view and a vertical sectional view of the heat detecting unit in association with each other. The heat detecting unit 11 is a thermal sensor which senses the heat in the monitoring area, and includes a sensor unit 30, a metal electrode 40, and a metal electrode 50. The sensor unit 30 is a sensor which converts a sensed state into another state change, and, for example, is a thin plate-like thermal sensor formed from a thin film-like ferroelectric material. The ferroelectric material outputs pyroelectric currents by pyroelectric effect when the temperature in the monitoring area changes. The metal electrodes 40 and 50 are electrode units which output the pyroelectric currents supplied from the sensor unit 30 to the sensing-device main body 21 via an electric wire or the like.

The sensor unit 30, the metal electrodes 40 and 50 form a layered structure of three layers. The metal electrodes 50 and 40 are arranged on an outer side (side facing the monitoring area: the same applies below) of the sensor unit 30 and an inner side (side farther from the monitoring area: the same applies below) of the sensor unit 30, respectively. The sensor unit 30, the metal electrode 40, and the metal electrode 50 are formed in a substantially thin disk-like shape, and substantially concentrically stacked one on another. Here, the diameter is gradually increasing from the metal electrode 40, to the sensor unit 30, and to the metal electrode 50. The sensor unit 30 is adhered to the metal electrode 50 by adhesive, whereas the metal electrode 40 is vapor deposited on the sensor unit 30.

A laminating portion 60 is a laminating unit which sandwiches the heat detecting unit 11, and includes an outer laminating member 61 and an inner laminating member 62. The outer laminating member 61 corresponds to a thin plate-like member recited in the appended claims, while the inner laminating member 62 corresponds to an adhesive film recited in the appended claims. The outer laminating member 61 is arranged on an outer side of the metal electrode 50, and the inner laminating member 62 is arranged on an inner side of the metal electrode 40.

The outer laminating member 61 and the inner laminating member 62 are formed in a substantially thin disk like-shape having a sufficiently larger diameter than the diameter of the metal portion 50 so that the sensor unit 30, the metal electrode 40, and the metal electrode 50 can be sandwiched therebetween. The diameter of the outer laminating member 61 is larger than the diameter of the inner laminating member 62 so that an outer peripheral portion of the outer laminating member 61 protrudes farther outward than the inner laminating member 62. An adhesive material is applied on an entire surface of the inner laminating member 62 at a side facing the outer laminating member 61. When the outer laminating member 61 is put together with the inner laminating member 62 with the heat detecting unit 11 sandwiched therebetween, the heat detecting unit 11 is sandwiched and held by the laminating portion 60.

In practice, the outer laminating member 61 and the inner laminating member 62 may formed from any material and have any dimension. For example, the outer laminating member 61 may be formed from resin and has thickness of 0.2 mm or less in consideration of strength, stress absorbing characteristics, plasticity, and thermal responsiveness. The inner laminating member 62 is formed from resin, and has thickness of 0.05 mm or less, for example. The upper temperature limit of the outer laminating member 61 and the inner laminating member 62 is preferably 85° C. or more in consideration of an operating temperature of the heat detector 1 and a melting temperature of resin.

Further, the inner laminating member 62 has a cut-out portion 62a as shown in FIG. 3. Specifically, the cut-out portion 62a is formed as a substantially U-shaped groove cut out from the outer periphery into the center of the inner laminating member 62. Here, when an electric wire or the like electrically connected to a controlling unit (not shown) is directly soldered to the metal electrodes 40 and 50 partly exposed from the cut-out portion 62a, the heat detecting unit 11 and the controlling unit (not shown) can be electrically connected. A manner of connecting the electric wire to the metal electrode 40 or 50 is not limited to the structure described above, and any other manner can be employed. For example, a thin-diameter electric wire connected to the metal electrode 40 or the metal electrode 50 may be laminated by the outer laminating member 61 or the inner laminating member 62 together with the metal electrode 40 or 50, and the electric wire may be pulled out from between the outer laminating member 61 and the inner laminating member 62 towards the sides thereof.

Next, a structure of the sensing-device main body 21 will be described. The sensing-device main body 21 includes a controlling unit (not shown) and a casing 81. The controlling unit is a controller that receives the pyroelectric currents supplied from the heat detecting unit 11, compares the level of the pyroelectric currents with a predetermined threshold, for example, and decides whether the fire occurs or not, and raises an alarm according to the result of decision. The controlling unit is, for example, formed with an Integrated Circuit (IC) and a program executed by the IC, and conducts a predetermined control.

The casing 81 is a framework of the heat detector 1 and a protector that protects the controlling unit (not shown). As shown in FIGS. 1 and 2, a substantially disk-like connection surface portion 81a is formed on an inner side close to a lower edge of the casing 81, and the heat detecting unit 11 which is sandwiched and held by the above-mentioned laminating portion 60 is fixed at the connection surface portion 81a. The casing 81 can be manufactured from any material by any method in practice. For example, the casing 81 is formed by resin molding.

Next, a structure connecting the heat detecting unit 11 and the casing 81 will be described in further detail. A connection surface portion 81a of the casing is formed from an opening 81c and a connecting portion 81d. The opening 81c is substantially concentric with the connection surface portion 81a and a substantially circular plane opening. An outer diameter of the opening 81c is defined so as to be smaller than the diameter of the outer laminating member 61 and larger than the diameter of the metal electrode 50. Hence, when the heat detecting unit 11 is pushed to the connecting surface portion 81a from the outer side, a portion of the heat detecting unit 11 other than the outer laminating member 61 is arranged inside the casing 81 through the opening 81c. Thus, the heat detecting unit 11 is protected by the casing 81. At the same time, the outer laminating member 61 of the heat detecting unit 11 is pushed to and contacts with the connecting surface portion 81a, whereby the heat detecting unit 11 can be fixed to the casing 81 via the connecting surface portion 81a.

Further, an outer edge portion 81e of the casing 81 protrudes farther to the outer side than the connecting surface portion 81a. The outer edge portion 81e is formed so as to have the substantially same inner diameter as the outer laminating member 61, or slightly larger inner diameter than that of the outer laminating member 61. Hence, when the outer laminating member 61 is arranged between the internal surface of the outer edge portion 81e and the connecting surface portion 81a, the casing 81 does not misalign with the outer laminating member 61, and the outer laminating member 61 can be properly held.

As shown in FIG. 2, on an outer side surface of the connecting surface portion 81a, a connecting portion 81d is formed. The connecting portion 81d is a portion to be melted at which the heat detecting unit 11 is adhered to the casing 81, and is formed as a circular protrusion substantially concentric with the connecting surface portion 81a. Hence, as shown in FIG. 1, when the inner side surface of the outer laminating member 61 is attached to the outer side surface of the connecting surface portion 81a and the connecting portion 81d is melted by ultrasonic waves or heat, the connecting portion 81d and a connecting portion 61a of the outer laminating member 61 corresponding to the connecting portion 81d are adhered with each other, whereby the heat detecting unit 11 is adhered to the casing 81 by melting. Thus, the connecting portion 61a and the connecting portion 81d constitute a connector that connects the heat detecting unit 11 and the casing 81 with each other.

The heat detecting unit 11 is thus connected with the casing 81 only by the outer laminating member 61, which is a thin plate-like member. More specifically, as shown in FIG. 1, a gap W is formed between an edge portion of the connecting surface portion 81a of the casing 81 and the inner laminating member 62. Hence, the outer laminating member 61 can absorb the distortion of the casing 81 and the distortion caused by the difference in coefficients of thermal expansion of the heat detecting unit 11 and the casing 81 at the changes of ambient temperature. Thus, the distortion of the sensor unit 30, which generates an electric field by the piezoelectric effect, can be prevented from causing the malfunction of the heat detecting unit 11. Still further, the falling off of the heat detecting unit 11 from the casing 81 and the damages to the heat detecting unit 11 and/or the casing 81 can be prevented.

Still further, since the inner laminating member 62, which is an elastic adhesive film, is employed to fix the heat detecting unit 11 to the outer laminating member 61, the heat detecting unit 11 is not directly fixed to the outer laminating member 61. Thus, the heat detecting unit 11 can move in a lateral direction by a small amount relative to the outer laminating member 61, and the distortion therebetween can be absorbed.

Thus, when the heat detecting unit 11 is connected with the casing 81, only the metal electrode 50 and the outer laminating member 61 are disposed between the sensor unit 30 of the heat detecting unit 11 and the monitoring area. A combined thickness of the metal electrode 50 and the outer laminating member 61 can be significantly thinner than the combined thickness of the conventional casing and the adhesive. Therefore, the heat from the monitoring area can be transferred to the heat detecting unit 11 more easily. In addition, the outer laminating member 61 is formed from the resin with a small thermal conductivity to suppress the thermal conduction, i.e., escape of the heat, from the heat detecting unit 11 to the casing 81. As a result, the thermal responsiveness of the heat detecting unit 11 can be improved.

Further, since the connecting portion 81d is formed as a circular protrusion in the above-described connecting structure, the connecting portion 81d after the melting also forms a ring like shape substantially concentric with the connecting surface portion 81a, thereby closing the gap between the heat detecting unit 11 and the casing 81 over the substantially entire planar periphery thereof. Since the heat detecting unit 11 and the casing 81 are sealed by the melting and adhesion of the connecting portion 61a and the connecting portion 81d, the entrance of foreign matters such as dust and moisture from the monitoring area into the inside of the casing 81 via the opening 81c can be prevented. Here, the connecting portions 61a and 81d correspond to the protector recited in the appended claims.

Further, the connection between the heat detecting unit 11 and the casing 81 is realized by the adhesion by melting of the connecting portion 61a of the outer laminating member 61 and the connecting portion 81d of the connecting surface portion 81a. The process of melting and adhering can be finished in a shorter time period than the conventional adhering process. Dissimilar to the conventional process, it is not necessary to temporarily fix the heat detecting unit to the casing until the adhesive is hardened, and the process becomes easier to perform. In addition, the management of the adhesive itself such as storage and handling become unnecessary, whereby the production efficiency of the heat detector 1 can be improved.

According to the first embodiment, the distortion of the casing and the distortion of the heat detecting unit caused by the difference in the coefficients of thermal expansion of the heat detecting unit and the casing or the like at the changes of the ambient temperature and the ambient pressure can be prevented, whereby the malfunction of the heat detecting unit can be prevented, and further, the falling off of the heat detecting unit from the casing, and the damages to the heat detecting unit and/or the casing can be prevented.

According to the first embodiment, the escape of heat from the heat detecting unit to the casing can be minimized, whereby the thermal responsiveness of the heat detecting unit can be improved.

Second Embodiment

A second embodiment will be described. A heat detector according to the second embodiment schematically has substantially the same features as the first embodiment. The heat detector according to the second embodiment is mainly characterized in that the heat detecting unit is connected to the casing via a stress absorber provided in the casing and that the heat detecting unit is directly exposed to the monitoring area. When not specifically described, the components of the heat detector of the second embodiment is similar to those of the first embodiment, and the same component will be denoted by the same reference character as in the first embodiment as necessary, and the description thereof will not be repeated.

FIG. 5 is a vertical sectional view of a heat detector 2 in a state where the heat detecting unit is connected to the casing, and FIG. 6 is a vertical sectional view of the heat detector 2 in a state before the heat detecting unit is connected to the casing. The heat detector 2 includes a heat detecting unit 12, a sensing-device main body 22, and a packing 90, but not the laminating portion 60. The packing 90 is a protector for preventing the entrance of foreign matters such as dust and moisture from the monitoring area to the inside of the casing 82.

A structure of the heat detecting unit 12 according to the second embodiment will be described. FIG. 7 shows a plan view and a vertical sectional view of the heat detecting unit 12 in association with each other. The heat detecting unit 12 includes a metal electrode 51 in place of the metal electrode 50 of the first embodiment. The metal electrode 51 has holes 51a. In FIG. 7, the metal electrode 51 has six holes 51a, though the number of the holes 51a is not limited to six. The holes 51a are arranged on an edge portion of the metal electrode 51. The edge portion on which the holes 51a are formed extends over the outer periphery of the sensor unit 30. The holes 51a are arranged at substantially equal intervals along a circle concentric with the metal electrode 51. The function of the holes 51a will be described later.

A structure of the packing 90 according to the second embodiment will be described. FIG. 8 shows a plan view and a vertical sectional view of the packing 90 in association with each other. The packing 90 has a substantially thin ring-like shape. On the periphery of the packing 90, holes 90a are formed at substantially equal intervals at positions corresponding to the positions of the holes 51a on the metal electrode 51. The packing 90 is formed from rubber, for example. The function of the packing 90a will be described later.

Next, a structure of the sensing-device main body 22 will be described. The sensing-device main body 22 includes a casing 82 in place of the casing 81 of the first embodiment. As shown in FIGS. 5 and 6, the casing 82 includes a connecting surface portion 82a in place of the connecting surface portion 81a of the first embodiment. The connecting surface portion 82a has a substantially thin disk-like shape and is formed at an inner side close to the lower edge portion of the casing 82.

A structure connecting the heat detecting unit 12 and the casing 82 will be described in further detail. The connecting surface portion 82a of the casing 82 includes a stress absorber 82b, an opening 82c, and a boss 82f. Though only two bosses 82f are shown in FIG. 6, more bosses 82f, for example, six bosses 82f are actually formed.

The stress absorber 82b has a substantially disk-like shape which is substantially concentric with the connecting surface portion 82a, and is thinner than the connecting surface portion 82a. The thickness of the stress absorber 82b is not particularly determined. However, in view of the strength, the stress absorbing characteristic, the plasticity, and the thermal responsiveness, the thickness of the stress absorber 82b is 0.2 mm or less. Further, the outer diameter of the stress absorber 82b is slightly larger than the outer diameter of the metal electrode 51 and the outer diameter of the packing 90. The length of the step formed at the boundary between the stress absorber 82b and the connecting surface portion 82a is preferably slightly longer than the combined length of the metal portion 51 and the packing 90 in the thickness direction. When the metal portion 51 and the packing 90 are pushed against the stress absorber 82b from the inner side, the metal portion 51 and the packing 90 can be made accommodated inside a space formed by the connecting surface portion 82a and the stress absorber 82b, whereby the position of the sensor unit 30 is substantially determined. Here, the stress absorber 82b corresponds to the stress absorber recited in the appended claims. Further, the opening 82c is substantially concentric with the stress absorber 82b and is a substantially circular planar opening.

The bosses 82f are arranged on the inner side surface of the stress absorber 82b, and more specifically, arranged at the substantially equal intervals along the circle concentric with the stress absorber 82b. Here, the central positions of the respective bosses 82f conform to the central positions of the holes 51a of the metal electrode 51 and the central positions of the holes 90a of the packing 90. Further, the boss 82f is slightly smaller than the diameter of the hole 51a, and the hole 51a and the hole 90a have substantially the same diameter.

Therefore, when the hole 90a of the packing 90 is inserted into the boss 82f, the packing 90 can be abutted on the casing 82. Further, when the hole 51a of the metal electrode 51 is inserted into the boss 82f, the metal electrode 51 can be abutted on the packing 90. The bosses 82f are portions to be melted at which the heat detecting unit 12 is adhered to the casing 82 by melting. When the boss 82f is melted by ultrasonic wave or heat while the casing 82, the packing 90, and the heat detecting unit 12 are tightly joined together, as shown in FIG. 5, the boss 82f adheres to the hole 51a, thereby connecting the heat detecting unit 12 and the casing 82 via the packing 90. Thus, the boss 82f and the hole 51a constitute a connector that connects the heat detecting unit 12 and the casing 82 with each other.

The heat detecting unit 12 is thus connected with the casing 82 only by the stress absorber 82b. More specifically, as shown in FIG. 5, the heat detecting unit 12 is connected to the casing 82 only by the portions of the bosses 82f of the casing 82, and the bosses 82f are formed on the stress absorber 82b. Since the stress absorber 82b is thin, the distortion of the casing 82 and the distortion caused by the difference in the coefficients of thermal expansion of the heat detecting unit 12 and the casing 82 at the changes of ambient temperature can be absorbed. Thus, the distortion of the sensor unit 30, which generates an electric field by the piezoelectric effect, can be prevented, leading to the prevention of the malfunction of the heat detecting unit 12. Still further, the falling off of the heat detecting unit 12 from the casing 82 and the damages to the heat detecting unit 12 and/or the casing 82 can be prevented.

The packing 90 has a substantially thin ring-like shape, and the inner diameter thereof is substantially the same with the outer diameter of the sensor unit 30, or slightly larger than the outer diameter of the sensor unit 30. Therefore, when the packing 90 is abutted on the heat detecting unit 12, the packing 90 does not extend between the sensor unit 30 and the monitoring area. Hence, the thermal transfer from the monitoring area to the sensor unit 30 is not interfered by the packing 90, whereby the thermal responsiveness of the sensor unit 30 can be enhanced. The outer diameter of the opening 82c is substantially the same size as the outer diameter of the sensor unit 30, or slightly larger than the outer diameter of the sensor unit 30, and substantially the same size as the inner diameter of the packing 90. Therefore, when the heat detecting unit 12, the packing 90, and the casing 82 are in mutual contact, the stress absorber 82b does not extend between the sensor unit 30 and the monitoring area. Hence, the thermal transfer from the monitoring area to the sensor unit 30 is not interfered by the stress absorber 82b, whereby the thermal responsiveness of the sensor unit 30 can be enhanced.

As a result, in the connecting structure as described above, the heat from the monitoring area is directly received by the metal electrode 51. The thickness of the metal electrode 51 can be significantly thinner than the combined thickness of the conventional casing and the adhesive. Further, since the sensor unit 30 does not have the laminating portion 60 which is included in the heat detector of the first embodiment, the thermal capacity of the sensor unit 30 is further lowered, to facilitate the heat transfer from the monitoring area to the heat detecting unit 12, whereby the thermal responsiveness of the heat detecting unit 12 is enhanced.

The outer diameter of the packing 90 is substantially the same size as the outer diameter of the metal electrode 51, or slightly larger than the outer diameter of the metal electrode 51. Hence, when the packing 90 is abutted on the heat detecting unit 12 and fixed to the casing 82, at least the outer peripheral edge of the packing 90 is abutted on the casing 82, whereby the packing 90 can close the gap between the heat detecting unit 12 and the casing 82.

As a result, in the connecting structure as described above, the heat detecting unit 12 and the casing 82 are connected with each other and sealed by the packing 90 posed therebetween, whereby the entrance of foreign matters such as dust and moisture from the monitoring area into the inside of the casing 82 through the opening 82c can be prevented. Thus, as described above, the packing 90 corresponds to the protector recited in the appended claims.

Further, the connection between the heat detecting unit 12 and the casing 22 is realized by melting of the boss 82f, which causes the adhesion of the boss 82f to the hole 51a as described above. The process of melting and adhering can be finished in a shorter time period than the conventional adhering process. Dissimilar to the conventional process, it is not necessary to temporarily fix the heat detecting unit to the casing until the adhesive is hardened, and the process becomes easier to perform. In addition, the management of the adhesive itself such as storage and handling become unnecessary, whereby the production efficiency of the heat detector 2 can be improved.

Thus, according to the second embodiment, further effect can be obtained in addition to the same effect as obtained in the first embodiment, i.e., since the heat detecting unit and the casing are sealed, the entrance of foreign matters from the monitoring area into the inside of the casing, and to the sensor unit can be prevented.

Third Embodiment

A third embodiment will be described. A heat detector according to the third embodiment schematically has substantially the same features as the first embodiment. Further, the heat detector according to the third embodiment is mainly characterized in that the heat detecting unit is exposed to the monitoring area through the stress absorber provided in the casing. When not specifically described, the components of the heat detector of the third embodiment are similar to those of the first embodiment, and the same component will be denoted by the same reference character as in the first embodiment as necessary, and the description thereof will not be repeated.

FIG. 9 is a vertical sectional view of the heat detector in a state where the heat detecting unit is connected to the casing, and FIG. 10 is a vertical sectional view of the heat detector in a state before the heat detecting unit is connected to the casing. A heat detector 3 includes a heat detecting unit 12 and a sensing-device main body 23.

Next, a structure of the sensing-device main body 23 will be described. The sensing-device main body 23 includes a casing 83 instead of the casing 81 of the first embodiment. FIG. 11 is a vertical sectional view of the casing in a state before the connection of a casing main body and a heat detecting-unit attachment unit. As shown in FIG. 11, the casing 83 includes a casing main body 84 and a heat detecting-unit attachment unit 85 to which the heat detecting unit 12 is attached. The casing main body 84 has an attachment unit 84a. Further, the heat detecting-unit attachment unit 85 includes an attachment unit 85a and a connecting surface portion 83a. Here, the attachment unit 84a and the attachment unit 85a are connectors which serve to connect the heat detecting-unit attachment unit 85 to the casing main body 84.

The casing main body 84 and the heat detecting-unit attachment unit 85 are separately formed by resin molding, and then the heat detecting-unit attachment unit 85 is subjected to insert molding into the casing main body 84, so that the heat detecting-unit attachment unit 85 and the casing main body 84 are connected with each other at portions of the attachment unit 84a and the attachment unit 85a. The connection is achieved in the above-described manner for the following reasons. To enhance the thermal responsiveness of the heat detector 3, it is sufficient to make the connecting surface portion 83a located between the heat detecting unit 12 and the monitoring area thinner to decrease the thermal capacity of the connecting surface portion 83a. The collective molding of the structure having a thin film portion, however, is difficult to achieve. Hence, the heat detecting-unit attachment unit 85 having the thin film portion is formed by resin molding, and then subjected to the insert molding into the casing main body 84 which is separately formed by resin molding, whereby the above-mentioned problem is solved. As a result, the casing 83 can be readily manufactured and the yield of the casing 83 can be improved. The heat detecting-unit attachment unit 85 corresponds to the attachment unit recited in the appended claims. Alternatively, the casing main body 84 and the heat detecting-unit attachment unit 85 may be integrated by melting and adhesion instead of insert molding.

Next, a structure connecting the heat detecting unit 12 and the casing 83 will be described in further detail. The connecting surface portion 83a is formed in the heat detecting-unit attachment unit 85 at an inner side near the lower edge portion opposite to the attachment unit 85a, and has a substantially disk-like shape. The connecting surface portion 83a includes a stress absorber 83b and a boss 83f. The stress absorber 83b has a substantially disk-like shape which is substantially concentric with the connecting surface portion 83a, and the inner side surface thereof is set so that the stress absorber 83b is thinner than the connecting surface portion 83a. The thickness of the stress absorber 83b is not particularly determined. However, in view of the strength, the stress absorbing characteristic, the plasticity, and the thermal responsiveness, the thickness of the stress absorber 83b is 0.2 mm or less. The outer diameter of the stress absorber 83b is slightly larger than the outer diameter of the metal electrode 51.

The length of the step provided at the boundary between the stress absorber 83b and the connecting surface portion 83a is slightly longer than the combined length of the metal portion 51 and the sensor unit 30 in the thickness direction. When the metal portion 51 and the sensor unit 30 are pushed against the stress absorber 83b from the inner side, the metal portion 51 and the sensor unit 30 can be accommodated inside a space formed by the connecting surface portion 83a and the stress absorber 83b, whereby the position of the sensor unit 30 is substantially determined. Here, the stress absorber 83b corresponds to the stress absorber recited in the appended claims. The boss 83f is the same as the boss 82f of the second embodiment. Though only two bosses 83f are shown in FIGS. 10 and 11, more bosses 83f, for example, six bosses 83f are actually formed.

Here, the outer side surface of the metal electrode 51 can be made abutted on the casing 83 by the insertion of the boss 83f into the hole 51a. The bosses 83f are portions to be melted at which the heat detecting unit 12 is adhered to the casing 83 by melting. When the boss 83f is melted by ultrasonic wave or heat while the casing 83 and the heat detecting unit 12 are tightly joined together as shown in FIG. 10, the boss 83f adheres to the hole 51a by melting, thereby connecting the heat detecting unit 12 and the casing 83. Thus, the boss 83f and the hole 51a constitute a connector that connects the heat detecting unit 12 and the casing 83 with each other.

The heat detecting unit 12 is thus connected with the casing 83 only via the stress absorber 83b. More specifically, the heat detecting unit 12 is connected to the casing 83 only by the portions of the bosses 83f of the casing 83 as shown in FIG. 10, and the bosses 83f are formed on the stress absorber 83b. Since the stress absorber 83b is thin, the distortion of the casing 83 and the distortion caused by the difference in the coefficients of thermal expansion of the heat detecting unit 12 and the casing 83 at the changes of ambient temperature can be absorbed. Thus, the distortion of the sensor unit 30, which generates an electric field by the piezoelectric effect, can be prevented, leading to the prevention of the malfunction of the heat detecting unit 12. Still further, the falling off of the heat detecting unit 12 from the casing 83 and the damages to the heat detecting unit 12 and/or the casing 83 can be prevented.

Thus, when the heat detecting unit 12 is connected with the casing 83, only the metal electrode 51 and the stress absorber 83b are located between the sensor unit 30 of the heat detecting unit 12 and the monitoring area. Hence, a combined thickness of the metal electrode 51 and the stress absorber 83b can be made significantly thinner than the combined thickness of the conventional casing and the adhesive. Therefore, the thermal capacity between the sensor unit 30 and the monitoring area becomes smaller to facilitate the thermal transfer from the monitoring area to the heat detecting unit 12. As a result, the thermal responsiveness of the heat detecting unit 12 is enhanced.

Further, the connection between the heat detecting unit 12 and the casing 83 is realized by melting of the boss 83f, which causes the adhesion of the boss 83f to the hole 51a as described above. The process of melting and adhering can be finished in a shorter time period than the conventional adhering process. Dissimilar to the conventional process, it is not necessary to temporarily fix the heat detecting unit to the casing until the adhesive is hardened, and the process becomes easier to perform. In addition, the management of the adhesive itself such as storage and handling become unnecessary, whereby the production efficiency of the heat detector 3 can be improved.

Further, as described above, the casing 83 is formed by the insert molding of the heat detecting-unit attachment unit 85 having the stress absorber 83b into the casing main body 84. The molding of the heat detecting-unit attachment unit 85 having the stress absorber 83b is easier than the integral molding of the casing 83 having the stress absorber 83b. Hence, the process as described above can improve the yield of the casing 83, further leading to the improvement of the productivity of the heat detector 3.

Thus, according to the third embodiment, since the stress absorber can be separately molded and then attached to the casing, the casing can be readily manufactured. Thus, the third embodiment has an effect of improving the yield and the productivity of the casing in addition to the same effect as the first embodiment.

Fourth Embodiment

A fourth embodiment will be described. In the fourth embodiment, the side surface, which is located at the side of the monitoring area, of a thin plate-like member is substantially covered by an entrance preventer. When not specifically described, the components of the heat detector of the second embodiment are similar to those of the first embodiment, and the same component will be denoted by the same reference character as in the first embodiment as necessary, and the description thereof will not be repeated.

FIG. 12 is a vertical sectional view of the heat detector according to the fourth embodiment, and FIG. 13 is a vertical sectional view of the heat detector before the connection of the heat detecting unit and the surrounding portion thereof and the casing. A heat detector 1 includes a heat detecting unit 11, a laminating portion 60, a protective film 100, and a sensing-device main body 110, and fixed to an attachment surface such as a ceiling C by a known manner.

Among the components, the heat detecting unit 11 is formed from layers of the sensor unit 30, and the metal electrodes 40 and 50 similarly to the first embodiment. The heat detecting unit 11 is sandwiched between the outer laminating member 61 and the inner laminating member 62 constituting the laminating portion 60 to protect the heat detecting unit 11 from external force applied from the monitoring area and/or entrance of corrosive components. In this regard, the laminating portion 60 functions as an entrance preventer which protects the heat detecting unit 11. Further, as described later, the heat detecting unit 11 is fixed to the casing 111 via the laminating portion 60. In this sense, the laminating portion 60 functions as a fixing unit that serves to fix the heat detecting unit 11 to the casing 111. The details of the laminating portion 60 will be described later.

On the side surface, which is located at the side of the monitoring area, of the outer laminating member 61, a protective film 100 is applied. The protective film 100 serves to prevent the entrance of a predetermined material from the monitoring area to the heat detecting unit 11, and corresponds to the entrance preventer recited in the appended claims. The details of the protective film 100 will be described later.

Next, a structure of the sensing-device main body 110 will be described. If not specifically described, the sensing-device main body 110 can be structured similarly to the main body portion of the known sensing device. The sensing-device main body 110 includes a controlling unit not shown and the casing 111.

The controlling unit is a controller which receives the pyroelectric currents supplied from the heat detecting unit 11, compares the level of the pyroelectric currents with a predetermined threshold, decides whether the fire occurs or not, and raises an alarm according to the result of decision. The controlling unit is, for example, formed from an Integrated Circuit (IC) and a program to be executed by the IC, and executes a predetermined control.

The casing 111 is a framework of a heat detector 41, and serves as a fixing unit that fixes the heat detecting unit. The casing 111 can be manufactured from any material by any method in practice. For example, the casing 111 is formed form resin molding. As shown in FIGS. 12 and 13, a substantially disk-like connecting surface portion 111a is formed on an inner side close to a lower edge portion of the casing 111, and the heat detecting unit 11 which is sandwiched and held by the above-mentioned laminating portion 60 is fixed to the connecting surface portion 111a by melting.

Since the outer laminating member 61 is directly fixed to the casing 111 by melting, the outer laminating member 61 is preferably formed from the substantially same type of resin as the resin used for the casing 111. Here, "substantially same type" means the type with an identical feature within a range so as to guarantee the compatibility of the outer laminating member 61 and the casing 111 at the melting and adhesion to a certain extent. It can be said that they are formed from "the substantially same type" of the resin, when the outer laminating member 61 and the casing 111 are formed from the completely same type of the resin; or the outer laminating member 61 and the casing 111 are formed from different kinds of resin each containing different additive and the same base; or alternatively formed from the same material processed into resin under different conditions. For example, if the casing 111 is formed from polycarbonate, the outer laminating member 61 may be formed from a film of polycarbonate.

Next, the protective film 100 will be described in further detail. The protective film 100 serves to prevent the entrance of a predetermined material from the monitoring area to the heat detecting unit 11, and corresponds to the entrance preventer recited in the appended claims. Here, any materials of a single type or a various types that can degrade or corrode the heat detecting unit 11 can be the "predetermined material", and the protective film can be made from a material selected corresponding to the predetermined material. For example, if the predetermined material is moisture, a moisture-proof film that serves to prevent the entrance of moisture may be selected as the protective film 100. Specifically, Cellel manufactured by Kureha Corporation, may be adopted. Alternatively, if the predetermined material is assumed to be corrosive gas (e.g., sulfur dioxide ($SO_2$), hydrogen sulfide ($H_2S$), nitrogen dioxide ($NO_2$), and chlorine ($Cl_2$)), a fluorocarbon resin film may be selected as the protective film 100 to prevent the entrance of the corrosive gases.

The protective film 100 is arranged at least on a side surface facing the monitoring area of two side surfaces of the outer laminating member 61. More specifically, the protective film 100 is formed in a circular thin plate-like shape which is substantially concentric with the outer laminating member 61, and covers the side surface of the outer laminating member 61 substantially completely. Thus, the protective film 100 can prevent the predetermined material in the monitoring area from passing through the outer laminating member 61 and reaching the heat detecting unit 11. Further, the protective film 100 may be applied to a wider range. For example, the outer laminating member 61 including two side surfaces thereof may be completely covered by the protective film 100. Yet, since the outer laminating member 61 is melted and directly adhered to the casing 111 as described later, a portion of the protective film 100 contacting with the casing 111 may be cut out, for example, so that the protective film 100 does not decrease the adhesiveness of the outer laminating member 61.

The protective film 100 may have any thickness as far as the protective film 10 can prevent the entrance of the predetermined material, and the thickness may vary depending on the material and the number of layers. Preferably the protective film 100 is made as thin as possible so that the protective film 100 does not obstruct the transfer of heat from the monitoring area to the heat detecting unit 11 as far as possible. For example, the protective film 100 is shaped into a film with the thickness of approximately 50 to 100 μm, and fixed to the side surface of the outer laminating member 61. Here, the protective film 100 can be fixed to the outer laminating member 61 in any manner in practice. Different manner may be adopted depending on the materials of the outer laminating member 61 and the protective film 100. For example, the protective film 100 can be fixed to the outer laminating member 61 by a thin two-sided tape, by thinly applied adhesive, or by vapor deposition.

Main effects of the protective film 100 with the above-described formation are as follows. As described above, the laminating portion 60 functions as an entrance preventer which protects the heat detecting unit 11. The laminating portion 60 has, however, a function as the fixing unit to fix the heat detecting unit 11 to the casing 111. Hence, in consideration of mutual adhesiveness of the outer laminating member 61 and the casing 111, the outer laminating member 61 and the casing 111 are preferably formed from the substantially same type of resin. Then, employable material for the outer laminating member 61 is significantly limited. Further, for the maintenance of the heat transfer efficiency from the monitoring area to the heat detecting unit 11, the outer laminating member 61 is preferably made as thin as possible. Thus, the shape of the outer laminating member 61 is also restricted. Due to these limitations in material and shape, complete prevention of passage of moisture and/or gases through the outer laminating member 61 is difficult to achieve. Further, when the adhesive with high water permeability is employed for the mutual adhesion of the outer laminating member 61 and the inner laminating member 62, the adhesive may induce the permeation of moisture into the outer laminating member 61. Then, the moisture and/or gases may permeate through the outer laminating member 61 to touch the heat detecting unit 11. In this case, the metal electrodes 40 and/or 50 may be oxidized, or the sensor unit 30 may be corroded. In other case, if the moisture enters between the sensor unit 30 and the metal electrode 40 or 50, a short circuit may be formed. Hence, for the protection of the heat detecting unit 11, it is useful to provide a second protective structure formed by the protective film 100 in addition to the laminating portion 60.

Thus, according to the fourth embodiment, the protective film 100 provided on the outer laminating member 61 can prevent the entrance of the predetermined material from the monitoring area to the heat detecting unit 11, whereby the degradation and/or the corrosion of the heat detecting unit 11 can be prevented. In particular, when the moisture-proof film is employed as the protective film 100, the entrance of moisture into the heat detecting unit 11 can be prevented, whereby the degradation of the heat detecting unit 11 and the formation of a short circuit can be prevented, and the reliability of the heat detector 4 can be maintained for a long period of time. In addition, since a thin film that does not obstruct the heat transfer is employed as the protective film 100, the thermal responsiveness of the heat detecting unit 11 can be maintained at a high level. Thus, two mutually contradictory purposes, i.e., the maintenance of the thermal responsiveness and the protection of the heat detecting unit 11 can be achieved at the same time. Further, since the protective film 100, which has the above-described effects, is provided closer to the monitoring area than the outer laminating member 61, the outer laminating member 61 can be similarly protected.

Fifth Embodiment

A fifth embodiment will be described. In a heat detector according to the fifth embodiment, the heat detecting unit and the electrode are substantially covered by the entrance preventer. When not specifically described, the components of the heat detector of the fifth embodiment are similar to those of the fourth embodiment, and the same component will be denoted by the same reference character as in the fourth embodiment as necessary, and the description thereof will not be repeated.

FIG. 16 is a vertical sectional view of the heat detector according to the fifth embodiment, and FIG. 17 is a vertical sectional view of the heat detector in a state before the connection of the heat detecting unit and the casing. As shown in FIGS. 16 and 17, a heat detector 5 includes a heat detecting unit 11, a laminating portion 60, protective films 120 and 121, and a sensing-device main body 110.

Dissimilar to the fourth embodiment, the laminating portion 60 has only the outer laminating member 61 on the side of the monitoring area. In other words, the laminating portion 60 does not have the inner laminating member 62 which is provided in the fourth embodiment, and the function of the inner laminating member 62 is realized by the protective film 121.

Next, a structure of the protective films 120 and 121 will be described. FIG. 18 shows a plan view and a vertical sectional view of the heat detecting unit sandwiched between the protective films in association with each other, and FIG. 19 is an exploded vertical sectional view of respective components shown in FIG. 18. The heat detecting unit 11 is covered by the pair of protective films 120 and 121, and fixed to the laminating portion 60 via the protective films 120 and 121.

The protective films 120 and 121 serve to prevent the entrance of a predetermined material from the monitoring area to the heat detecting unit 11, and correspond to the entrance preventer recited in the appended claims. Specifically, each of the protective films 120 and 121 is a thin resin film similar to the protective film 100 of the fourth embodiment, and has a disk-like shape with a slightly larger diameter than that of the heat detecting unit 11. The heat detecting unit 11 is arranged between the pair of protective films 120 and 121, and completely covered thereby. Thus, with the protective film 120 disposed closer to the side of the monitoring area than the heat detecting unit 11, the entrance of the moisture and/or corrosive gas into the heat detecting unit 11 can be prevented, and the environment resistance of the heat detecting unit 11 can be enhanced. Further, with the protective film 121 disposed on the opposite side to the protective film 120, the entrance of the moisture and/or corrosive gas into the heat detecting unit 11 from the side of the casing 111 can be prevented, and the environment resistance of the heat detecting unit 11 can be further enhanced. In particular, since the protective films 120 and 121 directly sandwich the heat detecting unit 11, the hardness of the heat detecting unit 11 can be enhanced, whereby the heat detecting unit 11 is strengthened so that the deformation of the heat detecting unit 11 by the external force, or the like can be prevented.

Here, the protective films 120 and 121 can be fixed to the heat detecting unit 11 or the laminating portion 60 by any manner. For example, hot melt may be applied to a surface, which faces the heat detecting unit 11, of each of the protective films 120 and 121, and the heat detecting unit 11 is placed between the protective films 120 and 121. Then, the protective films 120 and 121 are heated so that the hot melt is melted. Thus, the protective films 120 and 121 and the heat detecting unit 11 are mutually adhered. Then, the protective films 120 and 121 are adhered to the outer laminating member 61 by a thin two-sided tape or thinly applied adhesive.

Thus, according to the fifth embodiment, since the heat detecting unit 11 is sandwiched between the protective films 120 and 121, the degradation and the corrosion of the heat detecting unit 11 can be prevented, the hardness of the heat detecting unit 11 can be enhanced, and the deformation of the heat detecting unit 11 by the external force or the like can be prevented. The fifth embodiment can exert the similar effect as the fourth embodiment as well.

[III] Variation of Embodiments

Thus, the embodiments of the present invention are described above. Specific structures and components of the present invention can be optionally altered or improved within the scope of the technical concept of the present invention recited in the appended claims. Such variations of the embodiment will be described below.

Applicable Field of the Present Invention

The present invention can be applied not only to the heat detector as described above, but also to every device that senses heat in the monitoring area; for example, the present invention can be similarly applied to fire alarms, heat detectors, and hot wire sensors.

The problems to be solved by the invention and the effect of the invention are not limited by the above description. The embodiments may solve a problem not specifically mentioned above, may exert an effect not specifically mentioned above, may solve only a part of the problems described above, or may exert only a part of the effects described above. For example, even if the stress absorber cannot completely absorb the distortion of the heat detecting unit, as far as the stress absorber absorbs the distortion to a certain extent, the embodiments can be deemed to have solved the problems. Even when the protector cannot completely prevent the degradation or the deformation of the heat detecting unit, as far as the protector can prevent the degradation or the deformation at least more than the conventional device does, the embodiments can be deemed to have solved the problems.

The heat detecting unit may have any structure as far as the heat detecting unit can senses the heat in the monitoring area. For example, the heat detecting unit may have a component other than the sensor unit, the metal electrode, and the metal portion. Further, the metal electrode and the metal portion may be formed from different metal or conductive material, and the ferroelectric material of the sensor unit may not be thin film-like.

As the protector, a protector of any shape other than the thin disk-like film as described above may be employed. For example, when the heat detecting unit is formed in a rectangular shape, a rectangular protector that conforms to the shape of the heat detecting unit may be provided. Alternatively, the protector may cover only a portion of the heat detecting unit or a protective fixing unit. Still alternatively, as in the fifth embodiment, when both sides of the heat detecting unit are covered by the protector, the protector may be formed in different thickness on the side of the monitoring area from the side opposite to the monitoring area.

Still further, the stress absorber may be realized in any manners as far as the stress absorber can absorb the distortion of the casing or the like. For example, in the laminating portion, the inner laminating member may be removed and the outer laminating member and the metal portion may be directly adhered with each other by adhesive.

Further, the entrance preventer may be realized by adhesive, putty, or any other means as far as the entrance preventer can prevent the entrance of foreign matters to the inside of the casing. For example, if the gap between the heat detecting unit and the casing is filled with putty after the connection of the heat detecting unit and the casing, the entrance of foreign matter can be prevented.

Further, the connection between the heat detecting unit and the stress absorber may be realized in any manners, as far as the heat detecting unit and the stress absorber can be connected. For example, any number of bosses can be provided on the stress absorber and any number of holes can be provided on the metal electrode. As far as the arrangement of the bosses and the holes correspond with each other, they can be arranged in any manner. Further, the boss can be formed in any shape, such as cylinder, and the corresponding connector in the heat detecting unit can be formed in any shape other than the hole, and may be a U-shape groove formed in the metal electrode.

Still further, the connection between the casing main body and the heat detecting-unit attachment unit may be realized by any manners, for example, by adhesive, melting, adhesive tape, or clasp, as far as the casing main body and the heat detecting-unit attachment unit can be connected. For example, the attachment unit of the casing main body and the attachment unit of the heat detecting-unit attachment unit can be connected by adhesive.

INDUSTRIAL APPLICABILITY

The present invention can be applied to various devices, such as heat detectors and fire alarms, that sense heat and raise alarms according to the sensed state, and is useful for the enhancement of sensing accuracy, reliability, and the production efficiency of the heat detectors and the fire alarms, for example.

BRIEF DESCRIPTION OF THE DRAWINGS

FIG. 1 is a vertical sectional view of a heat detector according to a first embodiment;

FIG. 2 is a vertical sectional view of a heat detector in a state before connection of a heat detecting unit and a casing;

FIG. 3 shows a plan view and a vertical sectional view of the heat detecting unit in a state where the heat detecting unit is sandwiched by a laminating portion in association with each other;

FIG. 4 shows a plan view and a vertical sectional view of the heat detecting unit in association with each other;

FIG. 5 is a vertical sectional view of a heat detector according to a second embodiment;

FIG. 6 is a vertical sectional view of the heat detector in a state before connection of a heat detecting unit and a casing;

FIG. 7 shows a plan view and a vertical sectional view of the heat detecting unit in association with each other;

FIG. 8 shows a plan view and a vertical sectional view of a packing in association with each other;

FIG. 9 is a vertical sectional view of a heat detector according to a third embodiment;

FIG. 10 is a vertical sectional view of the heat detector in a state before connection of a heat detecting unit and a casing;

FIG. 11 is a vertical sectional view of the casing in a state before the connection of a casing main body and a heat detecting-unit attachment unit;

FIG. 12 is a vertical sectional view of a heat detector according to a fourth embodiment;

FIG. 13 is a vertical sectional view of the heat detector in a state before connection of a heat detecting unit, a surrounding portion thereof, and a casing;

FIG. 14 shows a plan view and a vertical sectional view of the heat detecting unit and a protective fixing unit in association with each other;

FIG. 15 is an exploded vertical sectional view of respective components shown in FIG. 14;

FIG. 16 is a vertical sectional view of a heat detector according to a fifth embodiment;

FIG. 17 is a vertical sectional view of the heat detector in a state before connection of a heat detecting unit and a casing;

FIG. 18 shows a plan view and a vertical sectional view of the heat detecting unit in a state where the heat detecting unit is sandwiched between protective films in association with each other;

FIG. 19 is an exploded vertical sectional view of respective components shown in FIG. 18; and FIG. 20 is a vertical sectional view of a conventional heat detector.

DESCRIPTION OF REFERENCE NUMERALS

C Ceiling
W Gap
1, 2, 3, 4, 5, 200 Heat detector
11, 12, 201 Heat detecting unit
21, 22, 23, 202 Heat detector main body
30 Sensor unit
40, 50, 51 Metal electrode
51a Hole
60 Laminating portion
61 Outer laminating member
61a, 81d Connecting portion
62 Inner laminating member
62a Cut-out portion
81, 82, 83 Casing
81a, 82a, 83a Connecting surface portion
81c, 82c, Opening
81e Outer edge portion
82b, 83b Stress absorber
82f, 83f Boss
84 Casing main body
85 Heat detecting-unit attachment unit
84a, 85a Attachment unit
90 Packing
90a Hole
100, 120, 121 Protective film
203 Adhesive

The invention claimed is:

1. A thermal sensing device comprising:
   a thermal sensing unit that senses heat in a monitoring area;
   a casing that holds the thermal sensing unit and that has an opening;
   an outer laminating member that is formed in a film-like shape, that is formed from same type of resin as resin used for the casing, and that absorbs the distortion caused by the difference in coefficients of thermal expansion of the thermal sensing unit and the casing at the changes of ambient temperature; and
   a pair of protective films that prevent entrance of moisture from the monitoring area into the thermal sensing unit,
   wherein the thermal sensing unit is arranged between the pair of protective films and covered thereby,
   wherein the thermal sensing unit covered by the pair of protective films is located at inner side of the opening of the casing,
   wherein the outer laminating member is disposed at outer side of the opening of the casing,
   wherein the opening is closed with the outer laminating member by connecting the edge portion of the outer laminating member with the edge portion around the opening of the casing by melting, and
   wherein the thermal sensing unit is fixed to the casing only by the pair of protective films and the outer laminating member.

2. The thermal sensing device according to claim 1, wherein,
   the thermal sensing unit is exposed to the monitoring area via only the thin plate-like member.

3. The thermal sensing device according to claim 1, wherein,
   the thermal sensing unit includes a ferroelectric material.

* * * * *